United States Patent [19]

Doll, Jr. et al.

[11] Patent Number: 5,351,276

[45] Date of Patent: * Sep. 27, 1994

[54] DIGITAL/AUDIO INTERACTIVE COMMUNICATION NETWORK

[75] Inventors: William J. Doll, Jr., San Diego; Murray S. Judy, Carlsbad, both of Calif.; Albert H. Kirchner, III, Great Falls, Va.; Thomas J. Krier, San Diego, Calif.; Rudolph M. McVicker, San Diego, Calif.; Brian E. Monroe, San Diego, Calif.; Meldon L. Pettitt, Poway, Calif.; Danny R. Reiswig, San Diego, Calif.; Alan Watchorn, Encinitas, Calif.; Jerry A. Wesley, San Diego, Calif.; John C. Wirfel, San Diego, Calif.

[73] Assignee: Simpact Associates, Inc., San Diego, Calif.

[*] Notice: The portion of the term of this patent subsequent to Jun. 30, 2009 has been disclaimed.

[21] Appl. No.: 823,851

[22] Filed: Feb. 10, 1992

Related U.S. Application Data

[63] Continuation-in-part of Ser. No. 655,107, Feb. 11, 1991, Pat. No. 5,127,003.

[51] Int. Cl.[5] .......................... H04M 1/64; H04J 3/02
[52] U.S. Cl. .......................... 379/67; 379/68; 379/96; 379/247; 379/269; 370/94.2; 370/110.1
[58] Field of Search .................. 379/67, 96, 247, 249, 379/93, 269; 370/110.1, 94.2, 94.1, 85.1

[56] References Cited

U.S. PATENT DOCUMENTS

| | | | |
|---|---|---|---|
| 4,866,758 | 9/1989 | Heinzelmann | 379/96 |
| 5,029,199 | 7/1991 | Jones et al. | 379/89 |

Primary Examiner—James L. Dwyer
Assistant Examiner—Fan Tsang
Attorney, Agent, or Firm—Gregory Garmong

[57] ABSTRACT

A communication system includes a digital network and an audio network such as a telephone system. An audio network server communicates with client work stations in the digital network and with the telephones in the telephone system. The audio network server stores, and plays back, digital representations of voice objects from, and to, a telephone handset. An instruction set accessible from the digital network controls operation of the audio network server and thus the telephone system to record and play back audio information stored on the audio server. The communication system may also include a caching capability to temporarily store compound documents or component objects in a media presentation server.

20 Claims, 4 Drawing Sheets

DIGITAL/AUDIO INTERACTIVE COMMUNICATION NETWORK

BACKGROUND OF THE INVENTION

This application is a continuation in part of application Ser. No. 07/655,107, filed Feb. 11, 1991, now U.S. Pat. No. 5,127,003, for which priority is claimed.

This invention relates to communication networks, and, more particularly, to a communication network in which digital information such as documents and audio information are integrated.

With the advent of lower cost, faster, and more sophisticated computers, the mechanisms for communication of information between human beings and computing systems continues to improve. Word processors permit the text of documents to be created and modified, either locally or in conjunction with networks of users. Electronic mail allows messages to be left in electronic "mailboxes" for later reading. Voice mail performs a similar function for voice messages, permitting them to be left in voice mailboxes for later review.

These systems, however, have not addressed and improved some of the most important and commonly used modes of communication between persons. In many instances, for example., a text document is created by one person on a word processor, and distributed to others for discussion and review. When the reviewers are together in a single place, they typically provide their comments verbally, there is discussion, and finally the document is annotated or revised. There is an opportunity to orally exchange and discuss viewpoints before the document is modified.

When the reviewers are working alone, they each typically make their comments in writing, either on the margin of a hard copy document or in a separate portion of the document if it is circulated electronically on a network. These written comments may be made available for consideration by the other reviewers. There is, however, no opportunity for each reviewer to present views orally.

The absence of effective oral communication in some instances can have an important adverse effect on the final document. Many persons can interact better and be more persuasive orally than in writing. Oral communication carries voice tones, volumes, inflections, and emphases that convey information in addition to that conveyed by the written transcription of the spoken words. When the documents are circulated through an electronic network and the only way to make comments is through typed input, those who do not type well are seriously hampered. Such persons may give up on their attempt to present their points, with the result that important views may never be considered by the author and the other reviewers.

Advances in technology have provided some aid for those who prefer oral communication. Speech synthesis capability that creates audible speech from digital text is available. There is progress on the inverse problem, speech recognition, but effective speech recognition systems require considerable improvement before they become widely used. There are programs and specialized hardware that run on a single, local computer, such as some versions of IBM(R) Displaywrite(R) computer software, that permit audio comments to be inserted into word processor documents. The available programs are not readily adapted to network applications, because the hardware that records and plays back digitized speech is often not compatible among the various types of computer work stations connected to the network.

There is a need for a networked communication system that permits a number of persons to interact with both digitally stored information such as written text and audio information such as speech, without communicating simultaneously. The present invention fulfills this need, and further provides related advantages.

SUMMARY OF THE INVENTION

The present invention provides a communication network for creating, storing, recalling, and revising compound documents containing text, data, image, video, other binary large objects (BLOBS), and audio, and manipulating the electronic representations of these compound documents. It further provides an efficient means for supporting delivery and presentation of these compound documents and composite objects while minimizing network bandwidth utilization. The communication network of the invention integrates otherwise-independent digital and audio communications networks. In one common mode of usage, it permits a user to make voice or other audio comments and insertions using an available telephone, at a specific location in a compound document maintained in a digital network and viewed on a work station terminal. Another user later reviewing the compound document at another work station can listen to the audio comments at the appropriate location in the compound document using that person's desk telephone, and add more oral comments. Audio portions of compound documents are heard with their original measure of tone, inflection, emphasis, volume and the like, not through mechanized speech.

A key feature of the system is that no physical modifications to the users' work station or telephone handsets are required, nor must the work stations have the same hardware and software, beyond being operable on the digital network. Hardware and software modifications can be made at a central location of each network, an important consideration because installation of the basic system as well as improvements can be made without requiring physical access to the users' work stations and telephones. The combination of digital and audio communication between work stations is enabled as long as the work stations are operable on a digital network, without regard to hardware and software differences that would otherwise prevent integration of combined digital and audio communication.

In accordance with the invention, a communication system operates with, and includes, digital network means for communicating digital information throughout a digital network, the digital network means including at least one, and usually at least several, work stations at which a human being can gain access to the digital network. The system also includes audio communications network means for communicating audio information throughout an audio communications network, the audio communications network means including at least one audio input/output device at which a human being can provide acoustic audio information (i.e., audio information travelling through the air) to, and receive acoustic audio information from, the audio communications network. In a preferred approach, the digital network includes a local area or wide area network (e.g., a metro are a network) employing cooperative processing client server or peer-to-peer architectures, including work stations at the desks of users. The audio communications network in eludes a local area or wide area telephone system, having handsets available at the work stations.

The communications system also includes digital network server means within the digital network means for processing digital information in the digital network, the digital network server means being in communication with the work station(s) through the digital network and having digital data storage means therein for storing digital information in the digital network server means. An audio communications network server means within the audio communications network means processes an electronic representation of audio information in the audio communications network, the audio communications network server means being in communication with the audio input/output device through the audio communications network. Audio data storage means for storing an electronic representation of audio information may be provided in either the digital network means, the audio communications network means, or both.

The digital network server means includes command means that controllably commands input/output operation of the audio communications network server means. The command means typically operates under the control of the system user, but may operate automatically. The digital network server means, including its command means, and the audio communications network server means, including both hardware and programmed instructions, may reside either in the same physical computing device or in separate devices, and allow the full integration of information on the two networks, which are otherwise independent of each other, under control of either the human user from the work station or any client computing system under human or automatic control.

The communications system also may include a media presentation server means with caching means that increases system responsiveness and reduces the network bandwidth utilization for playback of multimedia compound documents and objects.

A media presentation server is a special purpose server or process which delivers, presents, or controls delivery or presentation of one or more media types of a compound document to the user interface hardware. Examples of media presentation servers include, but are not limited to, voice servers and video servers. Media presentation servers may use a digital network means to deliver multimedia objects, such as employed by current video servers, or may use a completely separate network or connection for multimedia object delivery, such as the voice server described herein using the telephone network for voice delivery.

The transmission of audio, video, and binary large objects (BLOBs) to an individual work station or media presentation server requires a large transmission of data across the network. (As used herein, a "compound document" is one that includes two or more of the component objects: text, data, images, video, other BLOBs, and audio.) In some instances that transmission may not be effectively completed in real time or may so overburden the data transmission capability of the network that other users are effectively precluded from normal use of the system. The caching capability of a media presentation server provides temporary storage for a multimedia compound document or component objects from compound documents, so that they may be often, but not always, economically accessed by users without requiring that the entire compound document or objects be transmitted across the network from the storage server means to the media presentation server at the time of each access. The media presentation server with caching capability is of most value in the usual networking situation where a compound document is created and then accessed multiple times relatively soon after creation or even long after creation, if a document again becomes accessed multiple times within a relatively short period of time.

In the present media presentation server with caching capability, when a compound document or component object is first accessed, a copy of the compound document or component object (not the original) is stored temporarily in a storage device associated with that media presentation server. Transmission of the compound document or component object from the storage server means to the media presentation server may involve a substantial delay before the media presentation server is ready to respond to the work station request. However, once the document or component object is ready for accessing in the media presentation server, it is normally delivered to the work station in real time.

To avoid the delay associated with the transmission of the compound document or component object from the storage server means to the media presentation server for subsequent users, the media presentation server retains a copy of the compound document or component object in its storage device. Subsequent users can then access the compound document or component object without the delay associated with the movement of the accessed document or object from the storage server means to the media presentation server.

When the storage device of the media presentation server is full and more storage space is required for caching a further compound document or component object, previously stored copies of other documents or objects will be cleared from the storage device to make room for a copy of the new compound document or component object. If previously stored but subsequently removed compound documents or objects are accessed at a later time, a copy will again be stored on the media presentation server mass storage device. In any event, only the temporarily stored copy of the compound document is removed—the original remains in the storage server means and can always be accessed at a later time. Another advantage to the described caching approach within a media presentation server is that it is no longer necessary to backup or archive the media presentation storage device. Even if the disk were destroyed or erased, only copies of documents or objects would be deleted, and these copies would be reproduced from the storage server means at their next access.

An application of the present invention, implemented experimentally by the inventors in their office, aids in the understanding of its operation. A compound document is provided at a work station of the digital network, by typed input, scanned input, revision of a previously existing document, or other means. The entire compound document, including its component objects, is stored digitally in a local area network (LAN) file server. Another LAN user can recall the compound document at the same or another work station, and audio annotate the compound document by indicating in the compound document the location of an annotation to be inserted. The annotation can include both voice and other audio information, and this voice object is communicated to the audio telephone network through the telephone handset adjacent the work station. The location of the voice object is indicated in the text of the compound document with an appropriate symbol, termed an "audio icon". An advantage of annotating the text in this manner is the retention of its spatial format, with only the audio icon appearing within the text. The voice object itself can be stored in the LAN file server, the audio server, the work station client, or any other storage device connected to the network. The compound document can then be recalled at any of the LAN work stations and its text, data, image, or video portions displayed on the work station screen. At appropriate points in the body of the compound document, where the audio icon appears, the voice insertion is controllably replayed over the handset of the telephone network at the work station.

With the basic network interfacing capability available, a wide variety of improvements and modifications for particular applications can be implemented. For example, compound document modification control is typically provided, so that some readers may modify the basic compound document, while others may only make comments or only read the document without making any comments. A screening function can permit particular parts of documents to be reviewed only by certain users. Document encryption can be implemented in a variety of forms. Moreover, as new technologies such as automated speech recognition become commercially available, they can be integrated with the system so that the recorded oral comments can be transcribed automatically when desired.

Thus, the present invention provides an approach to recording, processing, storing, and playing back voice objects (having both voice and other audio information) through the audio communications network, in a manner that is fully integrated with compound documents managed on the digital communications network. This capability permits network users to improve their interactive oral/written communication. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE PREFERRED EMBODIMENT

Figure 1:
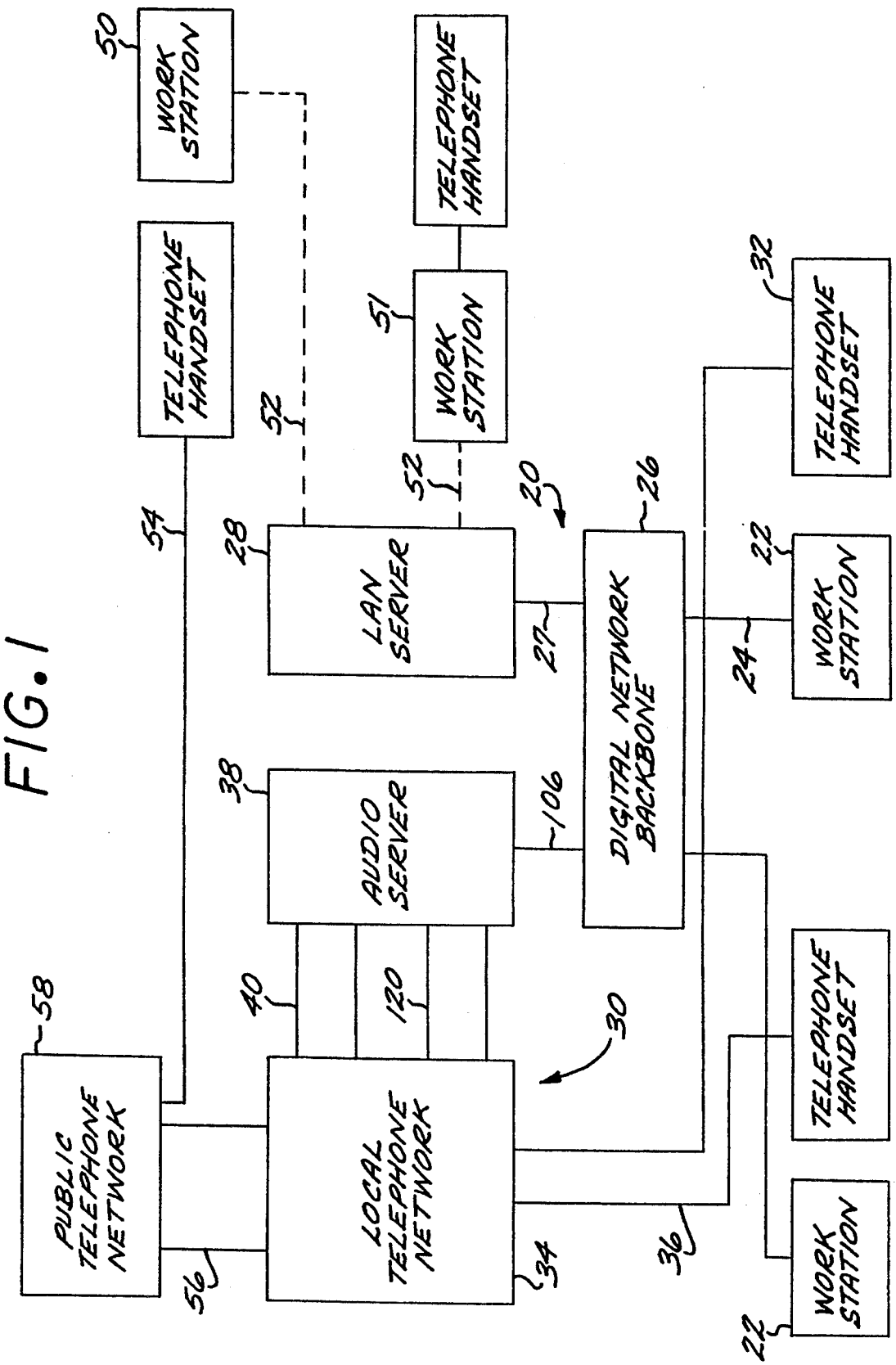
FIG. 1 is a pictorial representation of a communications system.

As illustrated in FIG. 1, two otherwise-independent networks are integrated by the present invention. A digital electronic network may be either a wide area network, a metropolitan area network, or a local area network (LAN), and is depicted here as a preferred LAN 20. The LAN 20 may communicate with other LANs, or with other digital networks. The LAN 20 includes one or more, and typically many more, work stations 22 that are located on user's desks. Each work station 22 typically has a keyboard and display with a hard wired digital communications line 24 to a digital network backbone 26. The work station 22 may also be a minicomputer, mainframe computer, or server that provides some remote or stand alone capability. The common digital network backbone 26 communicates through a digital communications line 27 with a digital network server, in this case a LAN server 28. The LAN server 28 includes a computer that receives digital signals from the work stations 22 over the path 24, 26, 27, does processing on the digital signals, and typically transmits new digital signals back to the same work station, or to other work stations or servers. The LAN server 28, acting as a communications server, may also transmit digital signals to remote work stations 50 having telephone communications 54 directly to the public telephone network 58 and work stations 51 having digital telephone communications. These remote work stations 50, 51 are not hard wired to the digital network backbone 26, but instead are connected via a communication link 52 such as a modem or microwave link. The LAN 20 thus provides both central and auxiliary computing power for individual work stations, and also a means of communicating among the work stations.

LAN hardware and software such as central computing systems and electronic mail systems are available commercially. The description of the LAN network 20 is not meant to imply any particular system architecture, and in fact the present approach is compatible with any such architecture. For example, many current networks use cooperative processing client-server and peer-to-peer architectures, wherein tasks are shared throughout a network, and the present invention is fully operable in conjunction with such architecture.

Another type of network is an audio communications network, illustrated as a telephone network 30. The telephone network 30 includes handsets 32 at the desks of users, in this case adjacent their work stations 22. The handsets 32 convert acoustic audio information (audio information travelling through the air) to electronic analog audio information that is a representation of the acoustic audio information. (The term "analog" is used herein to indicate non-digitized information. Audio information can be in acoustic form heard by the human ear, but also in either digitized or analog representations of the acoustic audio information when processed within electronic systems.) The electronic analog audio information may be communicated through a telephone line 36 in a local telephone network 34 such as a PBX network, which in turn may be interconnected to a public telephone network 58 through lines 56. Such local and public telephone systems, in stand alone or interconnected form, are widely used throughout the United States and the world. The electronic audio information can be digitized at locations within the system, as for example within the handset (a digital telephone) or within the network 34. Other types of audio communications networks can be employed such as intercom systems, paging systems, or radio frequency communications devices. A key feature of the present invention is that it is operable with all such systems.

An audio server 38 is provided as a key component in the integration of the digital and audio communication networks. The audio server 38 is connected to the local telephone network 34 (or in its absence directly to the public telephone network 58) and thence into the telephone system 30 by analog communications lines 40 of any suitable form such as hardwired or microwave, and may be dedicated or multiplexed. The audio server 38 may also be connected to the telephone network 34 by digital communications lines 120 of any suitable form such as Bellcore DS-0, DS-1, DS-3, or ISDN. The audio server 38 is a specific implementation or type of digital network server and has a digital network interface 106 comparable to the interface 27.

Figure 2:
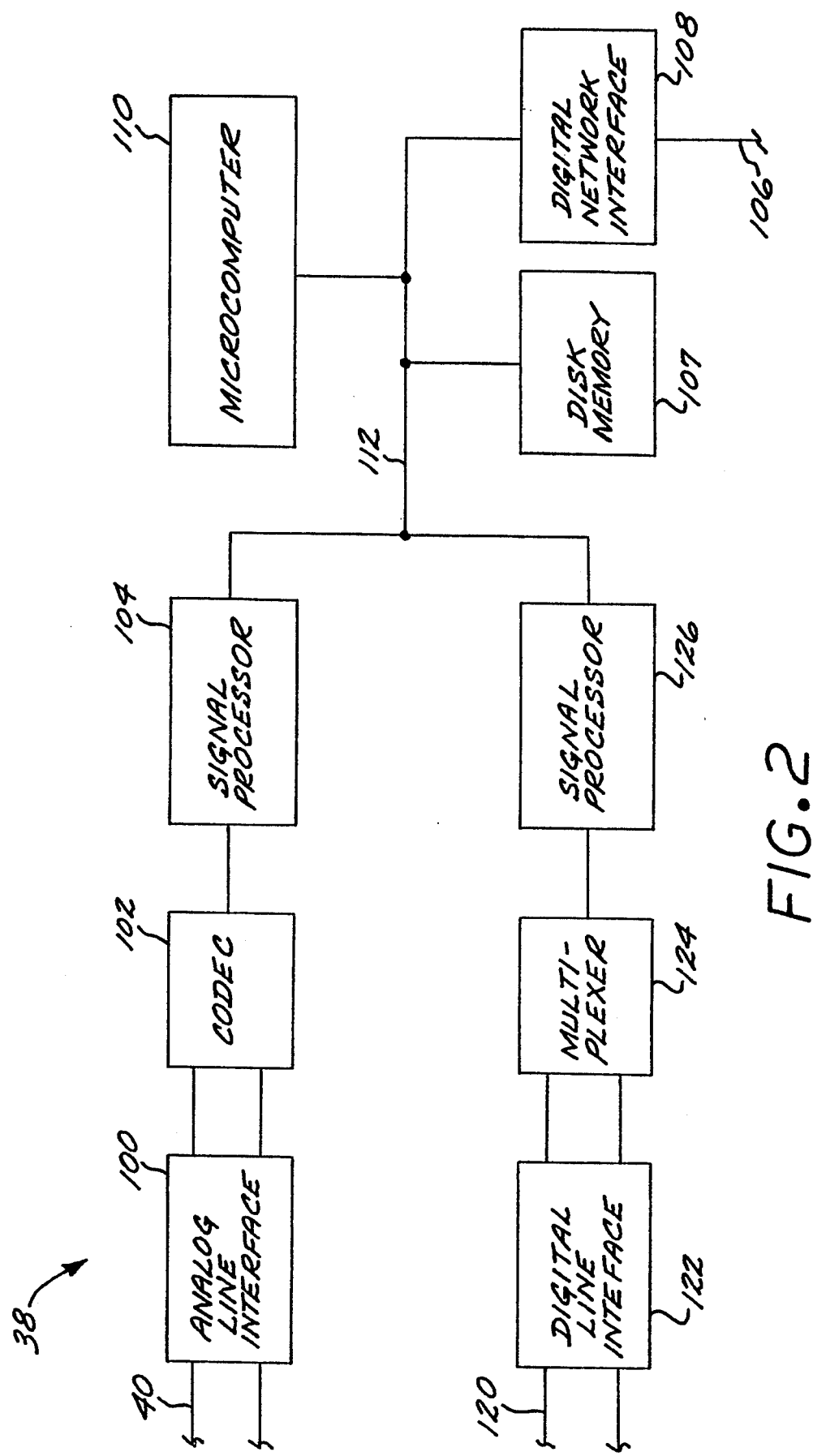
FIG. 2 is a schematic diagram of an audio server.

The audio server 38 is shown schematically in FIG. 2. Analog signals on lines 40 to or from the local telephone network 34 are sent or received through an analog line interface 100, comparable to that found in most telephone send/receive units. Analog telephone signals from the analog lines 40 are converted to digital signal representations of the audio signals by a codec (coder/decoder) 102 and sent to a signal processor 104. Outgoing signals are converted to analog form by the codec 102 for output to the analog lines 40.

Digital signals on lines 120 to or from the local telephone network 34 are sent or received through a digital line interface 122. Lines are selected by a multiplexer 124, and selected signals are passed through a signal processor 126.

The signal processors 104 and 126 use any of several known digital processing techniques, such as continuously variable delta modulation (CVDM), adaptive differential pulse code modulation (ADPCM), code excited linear prediction (CELP) or others that are known or may be discovered later, to compress the speech data arriving from the codec 102 or the multiplexer 124. The compressed digital data is typically transmitted across a microcomputer bus 112 by the signal processors 104 and 126 to a disk memory 107 for storage. During playback, the signal processors 104 and 126 receive compressed speech data from the disk memory 107, expand it to its original uncompressed form using the inverse form of the digital signal processing technique that compressed it, and send it to the codec 102 and analog interface 100 for output through the analog lines 40, or to the multiplexer 124 and digital line interface 122 for output through the digital lines 120.

A digital network interface 108 connects to a digital communications line 106 and provides a means of communicating with a variety of digital networks, both standard, such as IEEE 802.3, and non-standard, as well as both local area, such as IEEE 802.5, and wide-area, such as CCITT Recommendation X.25. The digital communications line 106 connects the audio server 38 to the digital network backbone 26 of the digital network 20. Information from the LAN 20 arrives on the communications line 106 as messages that are sent to a microcomputer 110 through the microcomputer bus 112.

The microcomputer 110 receives messages and controls the signal processor 104 and 126 and the disk memory 107 to accomplish the task requested by the message sent from the LAN 20. When the task is complete, the microcomputer 110 sends a return message back to the digital communication line 106 by means of the digital network interface 108. The microcomputer 110 can also control the transfer of digitized speech data, compressed or uncompressed, stored on the disk memory 107 to or from the digital communications network 20. By this approach, programmed instructions from work stations 22 can be used to control actions of the audio communications network 30, and vice versa.

In the preferred approach, the audio server 38 has been implemented using an AST Research Inc. Premium 386SX/16 Model 5V as the microcomputer 110 with a Western Digital Corporation Model 8003E thinwire ethernet adapter as the digital network interface 108. A Connor Peripherals 100-megabyte disk drive Model CT-3104 is used as the disk memory 107. The analog line interface 100, codec 102, and signal processor 104 were implemented using a Dialogic Corporation Model D/41B telephone Interface. The digital line interface 122, multiplexer 124, and signal processor 126 are implemented using a Dialogic Corporation Model DTI/101 interface board combined with a Dialogic Corporation model D/120 signal processing board.

In the preferred approach, the present invention has been implemented with an ethernet LAN 20 utilizing a Novell Corporation Advanced netware Operating System software Release 3.0. The work stations 22 were implemented with an AST Research Premium 986SX/16 Model 5V with Western Digital Corporation Model 8003 thinwire ethernet adapters connecting to the digit al communications line 24. The system utilized a local telephone network 34 that is a Harris Corporation Model D1200 PBX. The PBX was interconnected with standard twisted-pair wiring to Panasonic KX-T2135 analog telephones as the handsets 32. The PBX local telephone network 34 was connected to the available public switch telephone network 58. The analog lines 56 are conventional telephone lines installed by the telephone company to the PBX telephone network 34. No hardware or software modifications were made to the available work stations or telephone system as they were purchased commercially.

The hardware and operating system software discussed previously in operate conjunction with applications and system software. A convenient approach to the implementation of the present invention is to use commercially available applications software for the LAN 20 to the greatest extent possible. Since the preferred embodiment of the invention is directed toward an interactive network integration of audio information such as voice with text, data, and image, a commercially distributed database software product was selected. Lotus Notes(R) software was purchased from Lotus Development Corporation, Cambridge, Mass., and loaded into the LAN server 28. Lotus Notes(R) software provides basic creation, editing, distribution, and management features for the text, data, and image objects of compound documents, and is convenient for use at the networked work stations 22. Lotus Notes(R) software was chosen for the preferred implementation because it operates with a LAN implementation of a digital communications network 20, is based on a client/server architecture enabling use of the audio server 38, supports the import and export of foreign objects (such as audio, in the case of the present invention) into the documents it manages, and supports security features of the present invention.

System software executing in the work stations 22 and the audio server 38 control the present invention to achieve the desired integration of the telephone network 30 and the LAN 20. The software is implemented using a client/server architecture with the work stations 22 (and 50, 51) acting as the client and the audio server 38 acting as the server. The work station client software provides a variety of functions to application software that also is executed on the work stations 22. The application software can be any software program that requires recording and playback of audio information and can be modified to use the functions of the client software.

Control of the present invention originates at the work stations 22 whenever the application software requires the services of the present invention. This usually occurs as the direct result of some command from the human system user. However, it could also be the result of some other process, manual or automatic.

Figure 3:
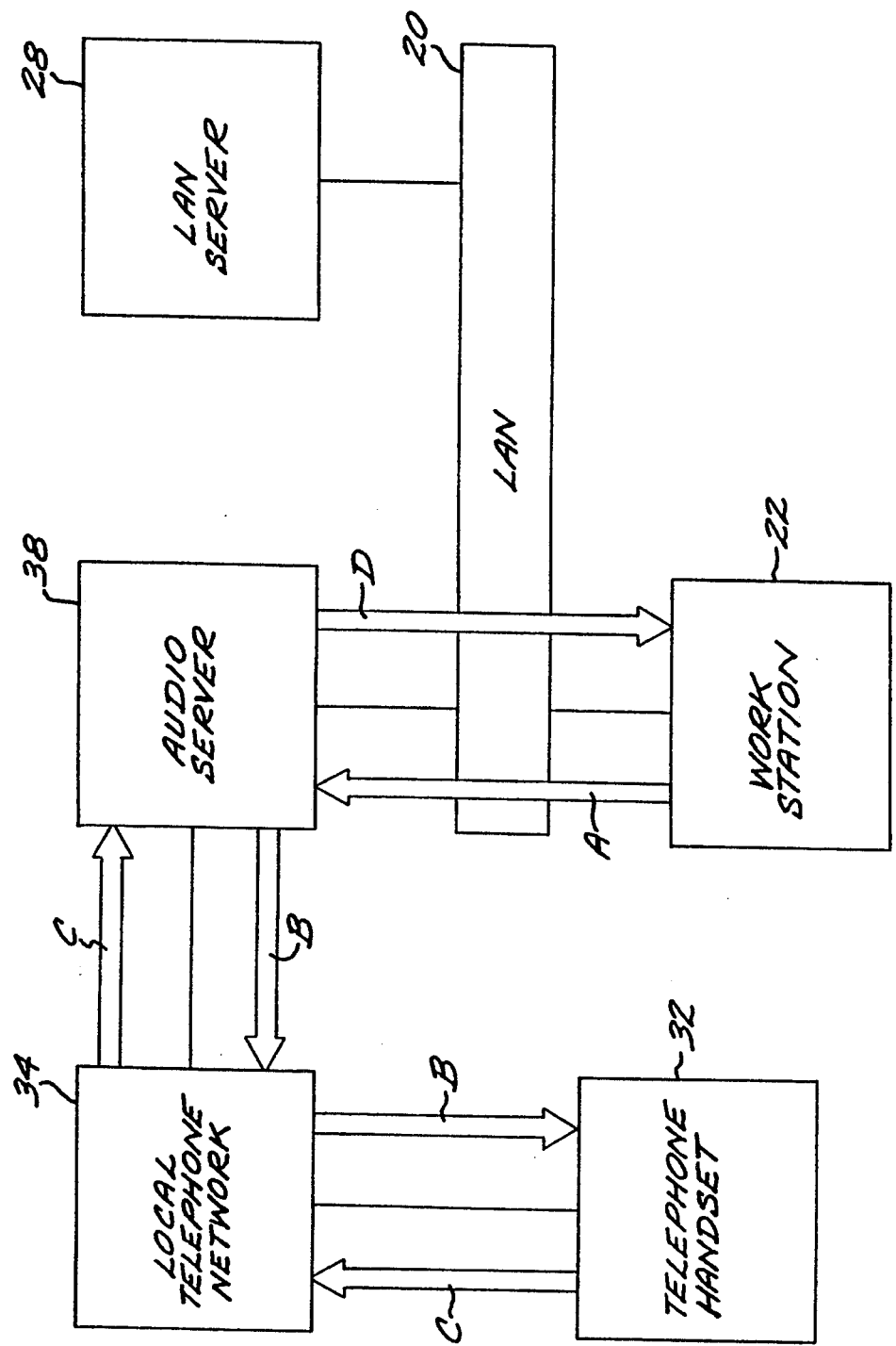
FIG. 3 is a block diagram of the information flow during processing of audio server commands.

The client software of the presently preferred embodiment provides seven basic functions to the application software: call phone, record voice object, play back voice object, delete voice object, store voice object, retrieve voice object, and hang up phone. The flow of control and data among the work stations 22, LAN 20, audio server 38, local telephone network 34, and telephone handset 32 is illustrated in FIG. 3 using labelled arrows called "paths" and is discussed in the following paragraphs.

The call phone function establishes an audio connection between the audio server 38 and the handset 32. When the application software executes the call phone function, the client software issues a call phone message that is sent across the LAN 20 to the audio server 38, path A. After receiving the message, the audio server 38 establishes the audio path to the telephone 32 by whatever means required by the local or public telephone network 34, path B. For analog circuits, this usually is accomplished by going off-hook, that is, establishing a nominal current flow in the analog lines 40 and issuing DTMF tones to dial the desired telephone handset causing the local telephone network 34 to issue ringing tones at the handset 32. For digital circuits, this is accomplished by changing the state of the signaling bits to indicate off-hook. When the user answers the handset 32, audio information, such as speaking the greeting "hello" or pressing any key on the telephone's DTMF keypad, is transmitted by the local telephone network 34 back to the audio server, path C. The audio server 38 interprets this as establishment of the connection and issues a confirmation message back to the client software by means of the LAN 20, path D. The client software notifies the application software that the call phone function has completed.

The record voice object function uses the audio connection between the audio server 38 and the handset 32 established by the call phone function to store the user's speech in compressed digitized form on the audio server 38. When the application software executes the record voice object function, the client software issues a record voice object message that is sent across the LAN 20 to the audio server 38, path A. After receiving the message, the audio server 38 delivers a tone or plays a prerecorded message, stored in compressed digitized form, to the user by means of the local telephone system 34 and handset 32 prompting the user to speak, path B. The user speaks the desired acoustic audio message which is transmitted back to the audio server 38 by means of the telephone 32 and local telephone system 34, path C, and the audio server 38 converts and stores the audio in compressed digitized form. Termination of the recording process is accomplished by the user pressing a key on the key pad of the handset 32 or the keyboard of the work station 22, by pausing the speech output for a predetermined time period, or by command from the work station 22. Upon termination, the audio server 38 issues a confirmation message, including the identification number of the recorded voice object, back to the client software by mean of the LAN 20, path D. The client software notifies the application software that the record voice object function has completed.

The application software can either leave the voice object on the audio server 38 for permanent storage or retrieve it for storage on the work station 22 or LAN server 28, acting as a storage server. The retrieve voice object function moves the compressed digitized voice object from the audio server 38 to the work station 22 in digital form. When the application software executes the retrieve voice object function, the client software issues a retrieve voice object message that is sent across the LAN 20 to the audio server 38, path A. After receiving the message, the audio server 38 sends the voice object to the work station 22, path D. The audio server 38 then issues a message indicating that the voice object was successfully retrieved to the client by means of the LAN 20, path D. The client software notifies the application software that the retrieve voice object function has completed, terminating the function.

The store voice object function moves the compressed digitized voice object from its location on the digital network to the audio server 38. When the application software executes the store voice object function, the client software issues a store voice object message that is sent across the LAN 20 to the audio server 38, path A. After receiving the message, the audio server 38 receives and stores the voice object using the voice object identification supplied in the message. The audio server 38 issues a message indicating that the voice object was stored, back to the client software across the LAN, path D. The client software notifies the application software that the store voice object function has been completed.

The playback voice object function uses the audio connection between the audio server 38 and the handset 32 established by the call phone function to deliver audio stored in compressed digitized form from the audio server 38 to the telephone 32 in acoustic audio form. When the application software executes the playback voice object function, the client software issues a playback voice object message that is sent across the LAN 20 to the audio server 38, path A. After receiving the message, the audio server 38 converts the specified voice object from compressed digitized form to analog form for analog signal lines 40 or digital form for digital signal lines 120, and delivers it to the user by means of the local telephone system 34 and the handset 32, path B. Upon completion of playback, the audio server 38 issues a confirmation message back to the client software by means of the LAN 20, path D. The client software notifies the application software that the playback voice object function is complete.

The delete voice object function deletes the compressed digitized voice object from the audio server 38. When the application software executes the delete voice object function, the client software issues a delete voice object message that is sent across the LAN 20 to the audio server 38, path A. After receiving the message, the audio server 38 deletes the voice object from the disk memory 107 using the voice object identification supplied in the message. The audio server 38 issues a message indication that the voice object was deleted back to the client software by means of the LAN 20, path D. The client software notifies the application software that the delete voice object function has been completed.

The hangup phone function terminates the audio connection between the audio server 38 and the handset 32. When the application software executes the hangup phone function, the client software issues a hangup phone message that is sent across the LAN 20 to the audio server 38, path A. After receiving the message, the audio server 38 terminates the audio path to the telephone handset 32 by whatever means required by the telephone system 34, path B. For analog circuits, this is usually accomplished by going on-hook, that is, terminating the nominal current flow in the analog lines 40. For digital circuits, this is accomplished by changing the state of the signaling bits to indicate on-hook. The audio server 38 issues a confirmation message back to the client software by means of the LAN 20, path D. The client software notifies the application software that the hangup phone function is complete.

The operation of the software has been described herein to show how a local work station 22 controls the audio server 38 and thence the communication of voice objects in the local telephone network 34. The invention can be applied in a number of different ways. The remote work station 50 connected to the LAN 20 by means of a telecommunications circuit 52 to the LAN server 38 can perform the same functions as the local work station 22. The voice objects can be communicated using the public telephone network 58 using the same techniques described previously for the local telephone system 34. If a remote work station 51 has its own audio playback and record capability, the voice objects can be recorded and played back directly. In another application of the present Invention, any computing device, such as the LAN server 28, connected to the LAN 20 can function as the client and utilize the audio server 38 to record and deliver audio information using the local telephone network The present Invention maintains the security of the voice objects, both stored in the audio server 38 and the work station 22 and also in transit across the LAN 20 by preventing disclosure of the audio information to unauthorized parties, using any of a variety of techniques. One technique, referred to as public key cryptography, is described in U.S. Pat. No. 4,405,829, whose disclosure is incorporated by reference. With this technique, the voice objects are encrypted and decrypted by the audio server 38 and the work station 22 as required.

Figure 4:
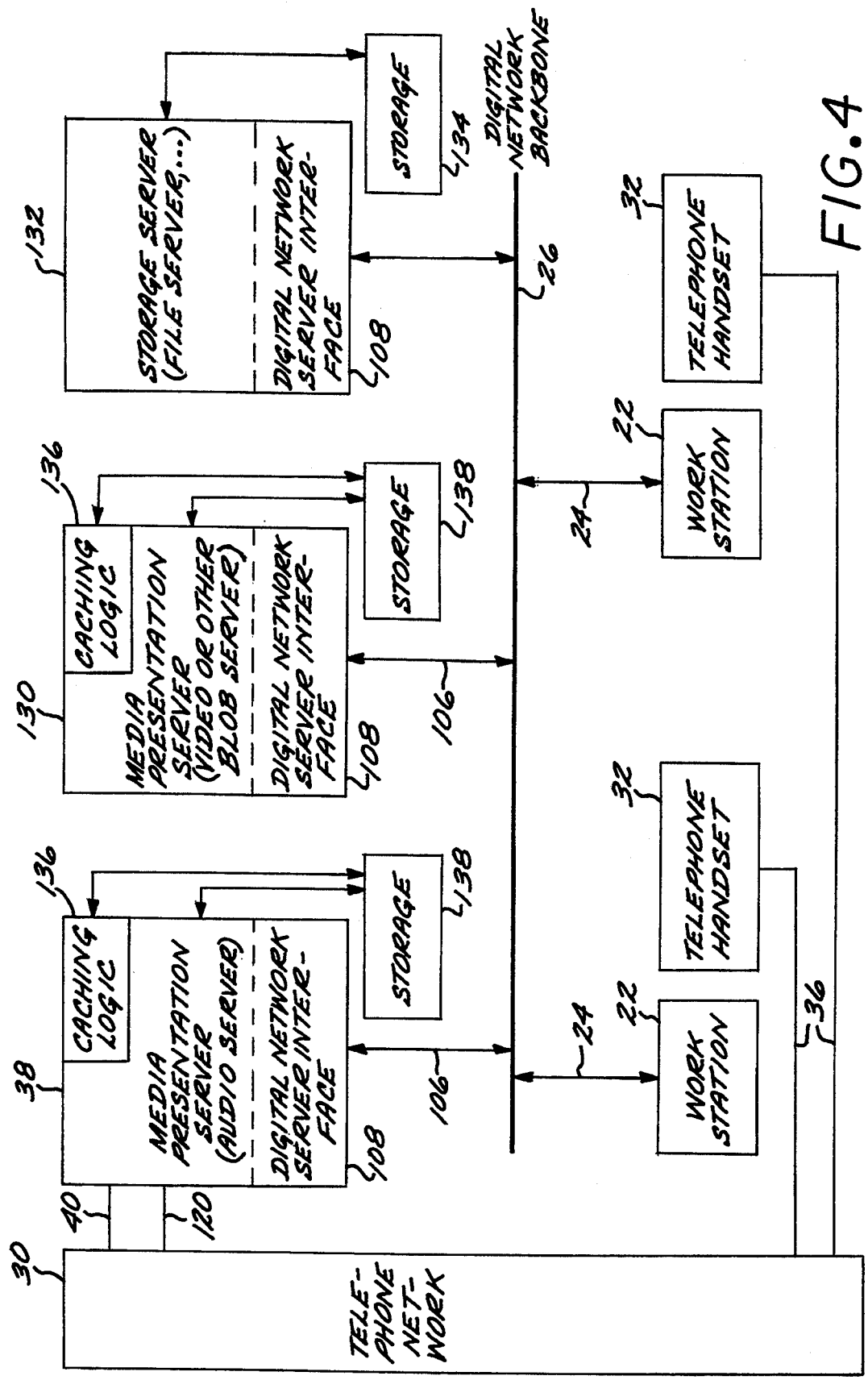
FIG. 4 is a block diagram of the communications system further incorporating multiple media presentation servers with caching capability.

In one embodiment, the present invention further provides a communications system having an audio media presentation server with caching capability 38 and a video (or other BLOB) media presentation server with caching capability 130, illustrated in FIG. 4. These media presentation servers with caching capability temporarily store compound documents or component objects in the manner to be described.

The motivation for the caching capability is best understood with reference to the sizes of the compound documents and their component objects. The nature of such component objects is that they often require large amounts of storage and enormous data transmission rates between the storage device and the recording or playback hardware to keep up with real-time presentation. For example, high fidelity raw audio can require 5 MB (megabytes) per minute of recording, and raw NTSC video almost 30 MB per second of recording. Data compression techniques exist for reducing the storage and data transmission requirements, but even with data compression the storage and transmission requirements are still very large.

In one system architecture, when a compound document and its associated component objects (such as video, other BLOBs, or audio) are created or received from a remote digital network, they are stored in a storage server 132 with an associated mass storage device 134 (e.g., disk) of very large capacity. When the compound document is to be accessed from one of the work stations 22, those component objects that are presented through media presentation servers are transferred across the digital network backbone 26 to the appropriate media presentation server, here illustrated as the audio server 38 and the video (or other BLOB) server 130. The transmission is under the control of the work station 22 or the media presentation server 38 and/or 130 through the digital network server interface 108, here illustrated in a distributed form equivalent to that of FIG. 1. This transmission may take on the order of seconds or minutes for large component objects such as video, and the user of the work station must wait until that transmission is complete before starting real-time access of the compound document. At that point the video or audio information can be presented in real time.

When a component object is received by the media presentation server such as 38 or 130, it is stored in an associated mass storage device 138. The media presentation server 38 or 130 then presents the component object to the work station 22 upon demand. In the case of an audio component object presented by the audio server 38, the presentation is through the telephone network 30, telephone line 36, and handset 32. In the case of a video (or BLOB) object, the video (or BLOB) media presentation server 130 controls sending the video (or BLOB), typically in synchronized pieces, through the digital network server interface 108, across the digital network 26 to the work station 22 for presentation. The presentation is typically through the video display of the work station 22, although there may be other hardware presentation devices. The media presentation servers 38 and 130 are designed so that the presentation of the component object is at the appropriate real-time rate.

The caching capability comes into play with the subsequent treatment of the component object stored in the mass storage device 138 of the media presentation servers. Without the caching capability, if the same component object is later requested for presentation, it would be again transferred from the storage server 132 to the media presentation servers 38 and 130, which, as Indicated, may involve a transmission delay of seconds or minutes.

Instead, with caching capability controlled by caching logic 136 resident in each of the media presentation servers, the most recently used component objects are temporarily retained in the storage device 138. When the storage capacity of the mass storage device is reached, the caching logic stores newly received component objects by overwriting the least recently accessed of the previously stored component objects. Of course, the overwritten component objects are not lost from the system. The original of each component object remains In the storage server mass storage device 134, and another copy will be later transferred to the appropriate media presentation server if it is needed.

This approach is based upon the premise that the most recently accessed compound documents are most likely to be accessed subsequently. That is, after a document is created on a network, it typically is reviewed and revised by the other network users authorized to see and revise the document, relatively soon after its creation. Without caching, each access of the document requires a time- and network bandwidth-consuming transfer from the storage server 132 to the media presentation servers 38 and 130. With caching, only the first access requires that transfer, and subsequent access allows immediate direct presentation from the media presentation server to the user. Experience with voice component objects, which are much smaller than video component objects, has shown that the caching approach saves a great deal of user time and network bandwidth.

In order for the media caching servers 38 and 130 to operate properly, each compound document or component object must be uniquely denominated. Creating a unique name for a document within a LAN not difficult. However, to avoid potential problems where the LAN is linked to other systems such as other LANs through a wide area network (WAN), the denomination must also be unique as to the world. Otherwise, two documents or their component objects, created on different LANs, could become ambiguous when the LANs are interconnected through the In the present approach, an identifier for the component objects is formed from three parts. The first part of the identifier is the serial number or other unique identifier of the recording device or media presentation server which created the object, which is established for each recording device or media presentation server in the system. The second part is the precise time at which the object was created, as read from the media presentation server clock. The third part is a large random number assigned by the media presentation server. This third part of the identifier acts as a security feature against an attempt by a user to gain unauthorized access to a document, and also as protection against the possibility that the server clock might be reset and another object created with the same server serial number and time of creation. The chances of duplication of an identifier according to this approach are vanishingly small, but the media presentation server nevertheless performs a check of existing objects in the disk cache before a new object is created to be certain that there is no duplication of identifier.

In the preferred embodiment of the invention, the software was written in the C language and compiled using the Microsoft Corporation C compiler version 6.

It will now be appreciated that the present invention provides an important advance in the art of communicating with a mixture of written and audible information. Although a particular embodiment of the invention has been described in detail for purposes of illustration, various modifications may be made without departing from the spirit and scope of the invention. Accordingly, the invention is not to be limited except as by the appended claims.

What is claimed is:

1. A communication system, comprising:
digital network means for communicating digital information throughout a digital network, the digital network means including at least one work station at which a human being can gain access to the digital network;
audio communications network means for communicating audio information throughout an audio communications network, the audio communications network means including at least one audio input/output device at which a human being can provide acoustic audio information to, and receive acoustic audio information from, the audio communications network;
audio communications network server means within the audio communications network means for processing an electronic representation of audio information in the audio communications network means, the audio communications network server means being in communication with the audio input/output device through the audio communications network;
audio data storage means within at least one of the digital network means and the audio communications network means, the audio data storage means communicating with the audio input/output device for storing an electronic representation off audio information; and
command means within the digital network means for controllably commanding input/output operation of the audio communications network server means to communicate the electronic representation of audio information and the acoustic audio information between the audio data storage means and the audio communications network means.

2. The communication system of claim 1, wherein the digital network means includes a local area network.

3. The communication system of claim 1, wherein the digital network means includes a wide area network.

4. The communication system of claim 1, wherein the audio communications network means includes a telephone network.

5. The communication system of claim 1, wherein the audio data storage means is within the audio communications network means.

6. The communication system of claim 1, wherein the audio data storage means is within the digital network means.

7. The communication system of claim 1, wherein the command means includes an instruction set that commands operation of the audio communications network server means using instructions that are input at the work station of the digital network means.

8. A communication system operable with digital network means for communicating digital information throughout a digital network, the digital network means including at least one work station at which a human being can gain access to the digital network; and audio communications network means for communicating audio information throughout an audio communications network, the audio communications network means including a least one audio input/output device at which a human being can provide acoustic audio information to, and receive acoustic audio information from, the audio communications network, the communication system comprising:
audio communications network server means within the audio communications network means for processing an electronic representation of audio information in the audio communications network means, the audio communications network server means being in communication with the audio input/output device through the audio communications network;
audio data storage means within at least one of the digital network means and the audio communications network means, the audio data storage means communicating with the audio input/output device for storing an electronic representation of audio information; and command means within the digital network means for controllably commanding input/output operation of the audio communications network server means to communicate the electronic representation of audio information and the acoustic audio information between the audio data storage means and the audio communications network means.

9. A communication system, comprising:

a digital electronic network having at least one work station at which a human being can process information in the digital network;

an audio communications network including at least one audio input/output device at which a human being can provide acoustic audio information to, and receive acoustic audio information from, the audio communications network;

an audio communications network server in communication with the at least one audio input/output device through the audio communications network, the audio communications network server including a digital network server interface that communicates with the at least one work station through the digital network, and an audio communications network server memory that stores digitized audio information; and an audio network server instruction set accessible from the digital network that operates the audio communications network server, the instruction set being operable by a user of the at least one work station.

10. The communication system of claim 9, wherein the audio communications server is included in a local area network.

11. The communication system of claim 9, wherein the audio communications network includes a telephone system.

12. The communication system of claim 9, wherein the audio communications network server comprises a programmable digital computer that includes the audio communications network server memory and audio communications network server instruction set.

13. A communication system, comprising:

digital network means for communicating digital information throughout a digital network, the digital network means including at least one work station at which a human being user can gain access to the digital network;

media presentation server means for presenting a media component object stored therein to the user, the media presentation server means including
a mass data storage device, and
caching means for retaining a cached set of media component objects in the data storage device; and command means within the digital network means for controllably commanding input/output operation of the media presentation server means to communicate the electronic representation of audio information and the acoustic audio information between an audio data storage means and an audio communications network.

14. The communication system of claim 13, wherein the media presentation server includes an audio server and the cached set of component objects are audio objects.

15. The communication system of claim 13, wherein the media presentation server includes a video server, and the cached set of component objects are video objects.

16. The communication system of claim 13, wherein the cached set of component objects is the set of component objects most recently presented to the user.

17. The communication system of claim 1, wherein the command means includes
means for controllably commanding input/output operation of the audio communications network server means to create, play, or edit a voice annotation insertion in a document stored in the digital network.

18. The communication system of claim 8, wherein the command means includes
means for controllably commanding input/output operation of the audio communications network server means to create, play, or edit a voice annotation insertion in a document stored in the digital network.

19. The communication system of claim 9, wherein the audio network server instruction set includes
an instruction set that operates the audio communications network server to create, play, or edit a voice annotation insertion in a document stored in the digital electronic network.

20. The communication system of claim 8, wherein the command m cans includes
means for controllably commanding input/output operation of the audio communications network server means to create, play, or edit a voice annotation insertion in a document stored in the digital network.

* * * * *